United States Patent [19]
Tamura et al.

[11] 3,857,921
[45] Dec. 31, 1974

[54] METHOD FOR ELIMINATING NITROGEN OXIDES AND CATALYST COMPOSITION FOR USE IN PRACTICING SAID METHOD

[75] Inventors: Nobuhiro Tamura; Ryoichi Mitsui; Seizaburo Watanabe; Kazuo Suga, all of Tokyo, Japan

[73] Assignee: Asaki Kasei Kogyo Kabushiki Kaisha, Osaka Prefecture, Japan

[22] Filed: Sept. 25, 1973

[21] Appl. No.: 400,679

[30] Foreign Application Priority Data
Sept. 27, 1972 Japan.............................. 47-96236
Feb. 26, 1973 Japan.............................. 48-22180
Apr. 16, 1973 Japan.............................. 48-42196

[52] U.S. Cl............ 423/213.5, 423/239, 252/466 J, 252/474
[51] Int. Cl............................................ B01d 53/34
[58] Field of Search............. 423/213.2, 239, 213.5; 252/474, 466 J; 60/301

[56] References Cited
UNITED STATES PATENTS
2,092,059   9/1937   Frazer.............................. 423/213.2
3,447,893   6/1969   Stephens et al.............. 423/213.5 X
3,476,508   11/1969  Kearby et al..................... 423/213.2
3,576,596   4/1971   Kranc et al......................... 423/239

OTHER PUBLICATIONS
Chemical Abstracts, Vol. 74, 1971, page 190.

Primary Examiner—G. O. Peters
Attorney, Agent, or Firm—Armstrong, Nikaido & Wegner

[57] ABSTRACT

Toxic substances contained in exhaust gases, especially nitrogen oxides contained in exhaust gases from automobiles, can be effectively eliminated, even in the presence of oxygen, by contacting such exhaust gases with a catalyst composition comprising iron or iron oxide, silver or silver oxide, at least a member selected from the group consisting of copper, beryllium, zinc, lead, indium, lanthanum, cerium and oxides of these metals, and a carrier. Especially good results can be obtained by employing a catalyst composition obtained by treating a composition comprising iron or iron oxide, silver or silver oxide, copper or copper oxide and a carrier with hydrogen sulfide, or by employing a catalyst composition comprising sulfides of iron, silver and copper supported on a carrier.

4 Claims, No Drawings

METHOD FOR ELIMINATING NITROGEN OXIDES AND CATALYST COMPOSITION FOR USE IN PRACTICING SAID METHOD

This invention relates to a method for converting toxic substances contained in exhaust gases from various industries and internal combustion engines, especially nitrogen oxides, to harmless substances.

More particularly, the invention relates to a method for eliminating toxic substances usually contained in exhaust gases discharged from internal combustion engines etc. such as nitrogen oxides, carbon monoxide, unburnt hydrocarbons and the like, especially nitrogen oxides, by contacting such exhaust gases with a specific catalyst in the substantial presence of oxygen.

In view of prevention of environmental pollutions, it is indispensable that toxic substances contained in exhaust gases e.g., from internal combustion engines should be eliminated by converting them to harmless substances. For example, in the case of automobile exhaust gases, with increase of the number of automobile holdings, bad influences by carbon monoxide, hydrocarbons and nitrogen oxides contained in the automobile exhaust gases increase abruptly and, hence, legal regulations have inevitably been issued as regards the allowable upper limits of discharged amounts of these toxic substances in released exhaust gases. In U.S.A., for example, the following upper limits applicable up to the end of 1975 are stipulated according to Code of Federal Regulations, Title 45, Subtitle A, Part 1201:

| | |
|---|---|
| Hydrocarbons | 0.41 g/vehicle mile |
| Carbon monoxide | 3.4 g/vehicle mile |
| Nitrogen oxides | 3.0 g/vehicle mile |

It is further stipulated that the upper limit of the amount discharged of nitrogen oxides should be 0.40 gram per vehicle mile from 1976.

On the same line as regulation stipulated in U.S.A., in Japan the interim report published by Japanese Central Conference for Prevention of Environmental Pollutions on Aug. 18, 1972 proposes the following upper limits as regards 1975 and later model year vehicles:

| | |
|---|---|
| Hydrocarbons | 0.25 g/vehicle kilometer |
| Carbon monoxide | 2.1 g/vehicle kilometer |
| Nitrogen oxides | 1.2 g/vehicle kilometer |

It is also proposed that the upper limit of the amount discharged of nitrogen oxides should be 0.25 g per vehicle kilometer as regards 1976 and later model year vehicles.

The regulations imposed on 1975 model year vehicles will be fully satisfied only by eliminating carbon monoxide and hydrocarbons, and it has been reported that methods capable of satisfying these regulations were developed and some of them have already been actually practised. As regards the regulation of nitrogen oxides concerning 1976 and later model year vehicles, however, no appropriate method is known. One of the main reasons for this is that nitrogen oxides are formed mainly when high temperature combustion is performed (when the output power is being increased) and therefore, prevention of formation of nitrogen oxides should naturally result in reduction of the output power. The second reason is that owing to chemical characteristics of reducing catalysts heretofore used for post treatment of nitrogen oxides, these catalysts are fatally defective in that when the concentration ratio of $CO/O_2$ in an exhaust gas is greater than 3, formation of ammonia is remarkable and when said ratio is smaller than 2, nitrogen oxides are hardly eliminated. Stated differently, in the system for the treatment of vehicle or automobile exhaust gases, which is different from a mere chemical process, it is substantially impossible to strictly control the treatment conditions, and in view of the fact that under engine combustion conditions forming large amounts of nitrogen oxides the concentration ratio of $CO/O_2$ is from about 1 to 1.5, none of coventional reducing catalysts are effective for eliminating nitrogen oxides contained in automobile exhaust gases. In short, the above regulation on the amount discharged of nitrogen oxides would not at all be satisfied with use of heretofore proposed catalysts.

We have made extensive investigations with a view to developing an exhaust gas-treating catalyst capable of eliminating nitrogen oxides in exhaust gases of which the $CO/O_2$ concentration ratio is from about 1 to about 1.5, namely in the substantial presence of oxygen, and we have now found that a catalyst comprising (a) iron or iron oxide, (b) silver or silver oxide and (c) at least a member selected from the group consisting of copper, beryllium, zinc, lead, indium, lanthanum, cerium and oxides thereof has excellent activity and selectivity for treating nitrogen oxides and when such catalyst is used for eliminating toxic substances contained in exhaust gases, especially nitrogen oxides, the catalyst exhibits a high eliminating effect with a long catalyst life. Based on this finding, we have now made this invention.

It is therefore a primary object of this invention to provide a catalytic method for eliminating effectively by one-step treatment toxic substances contained in exhaust gases, especially nitrogen oxides.

Another object of this invention is to provide a catalytic method for eliminating nitrogen oxides contained in exhaust gases, especially automobile exhaust gases, effectively by one-step treatment even in the substantial presence of oxygen.

A still further object of this invention is to provide a catalyst which is effectively used for the above methods for treatment of exhaust gases and which has high activity and selectivity for eliminating toxic substances contained in exhaust gases, especially nitrogen oxides, with a long life.

Other objects and advantages will be apparent from the detailed description given hereinafter.

According to the present invention, there is provided a method for eliminating toxic substances contained in exhaust gases, especially nitrogen oxides, which comprises contacting an exhaust gas with a catalyst comprising iron or iron oxide, silver or silver oxide, at least a member selected from a group consisting of copper, beryllium, zinc, lead, indium, lanthanum, cerium and oxides thereof, and a carrier.

In order to, illustrate prominent effects attained by the catalysts of this invention data of model experiments conducted on catalysts of this invention and comparative catalysts are given in Table 1. In these experiments, model gases having a composition indicated in Table 1 were passed through a catalyst layer under temperature and space velocity conditions indicated in Table 1 to obtain results shown in Table 1. Model gases used in these experiments contained a stoichiometrical amount of oxygen sufficient for the carbon monoxide and hydrocarbon to be completely converted. The reason for employment of such composition in the model gases is that it was intended to know to what extent nitrogen oxides would be reacted when oxygen was present in such stoichiometric amount, and that it is considered that unreacted oxygen is actually present, in an amount approximating such stoichiometric amount, in an exhaust gas discharged under such operation conditions as forming nitrogen oxides.

for purifying exhaust gases by eliminating nitrogen oxides even in the presence of oxygen, which comprises contacting an exhaust gas at a high temperature with a supported catalyst comprising as catalytic components iron or iron oxide, silver or silver oxide and at least a member selected from the group consisting of copper, beryllium, zinc, lead, indium, lanthanum, cerium and oxides thereof.

One of characteristic features of this invention is that when the catalyst of this invention is used for purifica- Table 1

| Run No. | Catalyst[1] | Composition of Model Gas[2] ($CO/CH_4/O_2/NO/H_2O$, volume ratio) | Temperature, °C. | Space Velocity $hr^{-1}$ | Conversion, % | | |
|---|---|---|---|---|---|---|---|
| | | | | | CO | $CH_4$ | NO |
| 1 | $(Ag_2O/Al_2O_3)H_2$ | 2/0.5/2/0.5/5 | 600 | 12,000 | 40 | 40 | 0 |
| 2 | $(Fe_2O_3/Al_2O_3)$ 10.0 | 2/0.5/2/0.5/— | 600 | 10,000 | 100 | 95 | 0 |
| 3 | $(CuO/Al_2O_3)H_2$ 10.0 | 2/0.5/1/0.5/— | 600 | 10,000 | 90 | 95 | 0 |
| 4 | $(Fe_2O_3—CuO/Al_2O_3)H_2$ 10.0  5.0 | 2/0.5/2/1/3 | 600 | 12,000 | 100 | 85 | 0 |
| 5 | $(Fe_2O_3—Ag_2O/Al_2O_3)H_2$ 10.0  5.0 | 2/0.5/2/1/3 | 600 | 12,000 | 95 | 85 | 0 |
| 6 | $(CuO—Ag_2O/Al_2O_3)H_2$ 5.0  2.0 | 2/0.5/2/1/5 | 600 | 12,000 | 95 | 100 | 0 |
| 7 | $(Fe_2O_3—CuO—Ag_2O/Al_2O_3)H_2$ 10.0  5.0  2.0 | 2/0.5/2/1/3 | 600 | 12,000 | 100 | 90 | 40 |
| 8 | do. | 2/0.5/2/0.5/6 | 520 | 14,000 | 100 | 75 | 50 |

[1]Each numerical value given below the catalyst component indicates the weight percent based on the carrier ($Al_2O_3$). "$H_2$" indicates that the catalyst used was one that had been subjected to the reducing treatment with hydrogen.
[2]Each model gas was diluted with He.

As is seen from the results shown in Table 1, when a model gas is, at a high oxygen concentration, subjected to one-step treatment, all of comperative catalysts (Run Nos. 1 to 6) advance predominantly the combustion reaction of carbon monoxide and hydrocarbon and do not convert the nitrogen oxide at all, which is possibly due to the fact that these catalysts exhibit only an effect of promoting the activity of oxygen. By contrast, the catalyst of this invention, for example those comprising oxides of iron, copper and silver (Run Nos. 7 and 8) exhibit, to our great surprise, an effect of converting the nitrogen oxide. Of course, comarative catalysts used in Run Nos. 1 to 6 have an activity of converting nitrogen oxides when oxygen is not at all present or when the amount of oxygen is as small as can be neglected. However, in view of the concentration of remaining oxygen in exhaust gases from internal combustion engines, it is apparent that with use of catalysts giving no effect at such an oxygen concentration as indicated in Table 1 (1.5 to 3% by volume) it is very difficult to purify exhaust gases by one-step treatment.

Although only the results of the iron-silver-copper catalyst as the catalyst of this invention are shown in Table 1, it was confirmed that similarly good results can be obtained with use of catalysts of this invention in which copper is replaced by beryllium, zinc, lead, indium, lanthanum and cerium.

As is seen from the foregoing explanation, this invention is based on the finding of a specific three-component catalyst capable of elimination of not only carbon monoxide and hydrocarbons but also nitrogen oxides, elimination of which in the presence of oxygen has heretofore been deemed substantially impossible.

More specifically, this invention provides a method tion of exhaust gases from automobiles, formation of ammonia is much more reduced than in the case of conventional catalysts. Accordingly, when an exhaust gas from an automobile is treated by a two-stage method comprising the first step of treating the exhaust gas with the catalyst of this invention and the second step of treating the gas from the first step by means of a customary converter, especially good results can be attained because it is possible at the first step to greatly reduce formation of ammonia which, if once formed at the first step, would be converted again to nitrogen oxides by oxidation at the second step.

The catalyst to be used in this invention comprises, as catalytic components, iron or iron oxide, silver or silver oxide and a third component selected from the group consisting of copper, beryllium, zinc, lead, indium, lanthanum, cerium and oxides thereof.

Amounts of these catalytic components will now be described. The iron component is contained in an amount, in terms of $Fe_2O_3$, of 5 to 70% by weight, preferably 10 to 60% by weight, based on the total catalyst composition. The silver component is contained in an amount, in terms of $Ag_2O$, of 0.5 to 20% by weight, preferably 1 to 15% by weight, based on the total catalyst composition, and the third component is contained in an amount, in terms of the highest oxide (for instance, PbO in the case of lead), of 0.5 to 40% by weight, preferably 1 to 25% by weight, based on the total catalyst composition. Weight ratios among these catalytic components may vary, within the above-mentioned range, depending on the catalyst preparation method, the order of deposition of these components on the carrier, the kind and properties of the carrier, the form of the final catalyst composition and the like.

In practising this invention, it is indispensable that these catalytic components should be used in the state supported on a carrier. As the carrier, there can be employed, for example, alumina, silica-alumina, silica, active carbon, titania, boria and the like. Further, spinel type carriers such as spinel magnesia-alumina and honeycomb carriers such as honeycomb alumina can be used in this invention. Amoung these carriers, an alumina carrier gives excellent results.

In this invention, the shape of the carrier is not critical, and carriers of the granular, spherical, honeycomb or other form can be used in this invention. However, especially good results can be obtained by employing a spherical carrier prepared by the following method which was developed by us. Namely, finely divided cellulose is added to a catalyst composition comprising the foregoing catalytic components supported on alumina powder or a catalyst composition comprising a mixture of the foregoing catalytic components in the powdery state with alumina powder, in an amount of 1 to 20% by weight, preferably 2 to 10% by weight, based on the total catalyst composition inclusive of alumina. Simultaneously, an alumina sol having an alumina content of 10 to 20% by weight is added to the above mixture as a kneading agent in an amount, in terms of pure alumina, of 2 to 15% by weight based on the above total catalyst composition, and water is further added in an amount of 10 to 40% by weight, preferably 15 to 30% by weight, based on the above total catalyst composition. The resulting mixture is kneaded and extruded by means of a kneader. The extrudate is cut and is rotated by means of a rotary granulator to shape it into a sphere. The thus formed spherical catalyst has a high catalytic activity with a good packing efficiency and a high resistance to abrasion and friction.

The preparation of the catalyst of this invention is performed by customary known methods such as immersion method, mixing and firing method, coprecipitation method and the like. Raw materials of catalytic components may take any form, as far as they are converted to metallic or oxide forms at the final step of the catalyst preparation process. In general, however, it is preferred that they are nitrates, acetates, oxalates or hydroxides. Of course, halides and sulfates that can be converted to metallic or oxide forms by approprietely conducting the coprecipitation or reduction may be used as raw materials in this invention. Furthermore, as described above, a catalyst can be prepared merely by mixing oxides of catalytic components with a powdery carrier and shaping the mixture to a suitable form. In this invention, the reduction treatment may be conducted in order to enhance the activity of the catalyst. In such case, hydrogen, hydrogen sulfide, hydrazine, formalin, carbon monoxide or the like is used as a reducing agent.

It has been found that in case a catalyst composition comprising iron, silver and copper as catalytic components is employed, if this catalyst is treated with hydrogen sulfide, the catalyst life is conspicuously prolonged and hence, the so treated catalyst is especially effectively applicable to the treatment of exhaust gases from automobiles, in which a high durability is required. As is apparent to those skilled in the art, in such case, the catalytic components, i.e., iron, silver and copper components, are caused to be present in the form of sulfides. In other words, the catalyst composition of this invention includes an embodiment in which the iron, silver and copper components are present in the form of sulfides.

In practising the method of this invention, the catalyst layer is maintained at a temperature of at least 300°C., preferably lower than 1,000°C. This temperature range covers temperatures of exhaust gases at the accelerating operation at which amounts formed of nitrogen oxides abruptly increase and temperatures of exhaust gases at the constant speed operation. Accordingly, it is generally unnecessary to heat or cool particularly the catalyst layer however, if the temperature of the exhaust gas is too low, it is possible to pre-heat the catalyst layer and if the temperature of the exhaust gas is too high, it is possible to provide a cooling by-pass.

In this invention, it is preferred that the exhaust gas is passed on the catalyst of this invention at a space velocity of from 6,000 to 60,000 $hr^{-1}$. In the case of an exhaust gas from an internal combustion engine of an automobile, the highest space velocity is generally about 10 times the lowest space velocity. The catalyst of this invention can exhibit an activity sufficient to comply with the change of the space velocity of the exhaust gas within such range. In case an exhaust gas contains a large quantity of carbon, it is possible to dispose a carbon-adsorbing agent at the inlet portion of the catalyst bed or layer.

The method of this invention can be applied to the treatment of exhaust gases from, for instance, reciprocating engines, rotary piston engines, gas turbine engines and the like. As fuels for such engines, there are usually employed city gas, natural gas, liquefied petroleum gas and liquid fuels such as gasoline, jet fuel and diesel oil. The method of this invention can be applied to the treatment of exhaust gases formed from any of such fuels. It is desired that contents of sulfur, halogens and the like are as low as possible. In the case of sulfur, no particularly unfavorable influence is brought about if the sulfur content is lower than 200 ppm (on the weight basis). As is seen from the fact that lead can be used as one component of the catalyst composition of this invention, the presence of lead in an exhaust gas has no serious influence on the life of the catalyst of this invention, though the influence by lead is not neglected in the case of conventional catalysts.

The foregoing explanation has been made mainly by reference to exhaust gases from internal combustion engines. A variety of nitrogen oxide-containing gases discharged from various fixed gas sources such as factories and plants can be effectively treated according to the method of this invention, and therefore, this invention is very advantageous for prevention of environmental pollutions caused by these exhaust gases.

This invention will now be detailed by reference to Examples, but the scope of this invention is not limited by these Examples.

EXAMPLE 1

150 c.c. of an aqueous solution containing in the dissolved state 102 g. of ferric nitrate, 5.7 g. of silver nitrate and 14.9 g. of lead nitrate were added to 100 g. of commercially available powdery alumina, and the mixture was heated and evaporated to dryness on a hot water bath, and was then dried at 120°C. a whole day and night. The resulting blocky solid was heated and calcined at 660°C. for 4 hours and reduced by passing hydrogen for 6 hours at 400°C.

60 c.c. of the catalyst so formed was packed into a reaction tube, and an exhaust gas from a 1,400 c.c.-capacity engine of Bluebird (registered trade name of an automobile manufactured and sold by Nissan Jidosha K. K.) operated at 2000 rpm with a gear ratio for high speed, the average composition (by volume) of which was 1.7% of CO, 490 ppm of HC (hydrocarbons), 690 ppm of $NO_x$ (nitrogen oxides) and 1.5% of $O_2$, the balance $H_2O$, $CO_2$ and $N_2$, was introduced into the packed reaction tube at a space velocity of 24,000 $hr^{-1}$, and the continuous operation was conducted while maintaining the temperature of the reaction tube at 600°C.

24 hours after the initiation of the operation, the conversion of $NO_x$ was 95%, and 321 hours after the initiation of the operation, the $NO_x$ conversion was 91%. Even 488 hours after the initiation of the operation, the conversion of $NO_x$ was as high as 90%, but 566 hours after the initiation of the operation, the conversion of $NO_x$ was reduced to 47%.

EXAMPLE 2

1.02 Kg. of ferric nitrate, 57 g. of silver nitrate and 5.0 g. of indium nitrate were added to 10 kg. of commercially available alumina sol (aluminum content : 10% by weight), and the mixture was agitated in a beaker and kneaded uniformly. The resulting kneaded slurry mixture was sprayed little by little from the beaker on an iron plate heated at 400°C. to dry and decompose the mixture. Then, the resulting powder was collected, and heated and calcined for 4 hours in an electric furnace maintained at 700°C. The fired product was pulverized by means of a ball mill. To 1.3 Kg. of the resulting powdery catalyst were added 30 g. of finely divided cellulose, 600 g. of alumina sol (alumina content : 10% by weight) and 160 g. of water, and the mixture was well kneaded. The resulting clay-like mixture was extruded by means of an extruder, cut and rotated at 700 rpm for 35 minutes by means of a rotary granulator. The resulting spherical catalyst was dried at 40°C. a whole day and night and then at 120°C. a whole day and night to obtain a spherical catalyst having a diameter of 5 mm. The catalyst so obtained was reduced at 450°C. for 10 hours under passage of hydrogen.

In the same manner as described in Example 1, an exhaust gas coming from the same engine as used in Example 1 was treated at 600°C. with use of the catalyst so formed. The flow rate of the exhaust gas was so adjusted that the space velocity was 32,000 $hr^{-1}$. $NO_x$ conversion was measured. The results are shown below.

| | |
|---|---|
| 24 hours after the initiation of the treatment | 97 % |
| 260 hours after the initiation of the treatment | 94 % |
| 466 hours after the initiation of the treatment | 95 % |
| 583 hours after the initiation of the treatment | 92 % |

At each measurement, it was found that the formed amount of $NH_3$ was less than 5 ppm.

EXAMPLES 3 TO 15

Blocky catalysts having a composition indicated in Table 2 were prepared in the substantially same manner as described in Example 1 or 2 (changes of the preparation conditions are described below).

With respect to each of the catalysts so obtained, the exhaust gas-treating activity and the catalyst life were tested. The amount of the catalyst used for the test was 10 c.c., and an exhaust gas coming from a 1,600 c.c.-capacity engine of Corona (registered trade name of an automobile manufactured and sold by Toyota Jidosha K. K.) operated at 2,000 rpm with a gear ratio for high speed was treated. In order to conduct the life test effectively, there was employed a device so arranged that the exhaust gas coming from one exhaust hole was divided into 10 parts, each part was introduced into one respective reaction tube and ten reaction tubes were simultaneously tested.

The catalyst used in Examples 3, 4, 6, 7 and 12 were prepared by the same coprecipitation method as described in Example 1.

The catalyst used in Example 5 was prepared by depositing nitrates of the catalytic components on a spinel $MgO-Al_2O_3$ carrier, calcining the deposited carrier at 660°C. for 4 hours and subjecting it to reduction with $H_2$.

The catalyst used in Example 8 was prepared by depositing silver nitrate and zinc sulfate on a spinel $Fe_2O_3-Al_2O_3$ carrier, calcining the deposited carrier at 660°C. for 4 hours and subjecting it to reduction with $H_2$.

The catalyst used in Example 9 was prepared by mixing powders of $Fe_3O_4$, Ag and PbO with powdery alumina and shaping the resulting powdery mixture in the same manner as described in Example 2.

The catalyst used in Example 10 was prepared by forming $PbO-Al_2O_3$ in advance and conducting the subsequent procedures according to the method described in Example 1.

The catalyst used in Example 11 was prepared by forming $In_2O_3-Al_2O_3$ in advance, pulverizing it, mixing the resulting powder with powders of metallic iron, silver and zinc and shaping the resulting powdery mixture in the same manner as described in Example 2.

Test results obtained are shown in Table 2.

Table 2

| Example No. | Catalyst Composition (numerical value given below catalytic component indicates % by weight based on carrier) | Reaction Temperature, C. | Space Velocity $hr^{-1}$ | $NO_x$ Conversion, % 24 hrs. | 144 hrs. | 216 hrs. | 408 hrs. | 552 hrs. | CO Conversion at 408 hrs., % | Amount of $NH_3$ formed at 408 hours, ppm |
|---|---|---|---|---|---|---|---|---|---|---|
| 3 | $(Fe_2O_3-Ag_2O-BeO/Al_2O_3)H_2$<br>20  4  2 | 600 | 16,000 | 92 | 90 | 93 | 95 | 92 | 24 | below 5 |
| 4 | $(Fe_2O_3-Ag_2O-ZnO/Al_2O_3)H_2$<br>20  2  5 | 600 | 22,000 | 96 | 92 | 94 | 88 | 66 | 17 | below 5 |
| 5 | $(Fe_2O_3-Ag_2O-ZnO/spinel\ alumina)H_2$<br>20  4  20 | 600 | 43,500 | 96 | 97 | 92 | 95 | 94 | 38 | below 5 |
| 6 | $(Fe_2O_3-Ag_2O-La_2O_3/Al_2O_3)H_2$<br>20 4  4 | 600 | 26,500 | 76 | 80 | 82 | 85 | 70 | 22 | below 5 |
| 7 | $(Fe_2O_3-Ag_2O-Ce_2O_3/Al_2O_3)H_2$<br>20  4  4 | 600 | 32,000 | 78 | 90 | 92 | 88 | 80 | 18 | 8 |
| 8 | $(Ag_2O-ZnO/spinel\ Fe_2O_3-Al_2O_3)H_2$<br>3  6  10 | 550 | 28,000 | 65 | 72 | 80 | 76 | 66 | 12 | below 5 |

Table 2—Continued

| Example No. | Catalyst Composition (numerical value given below catalytic component indicates % by weight based on carrier) | Reaction Temperature, C. | Space Velocity hr$^{-1}$ | NO$_x$ Conversion, % | | | | | CO Conversion at 408 hrs., % | Amount of NH$_3$ formed at 408 hours, ppm |
| --- | --- | --- | --- | --- | --- | --- | --- | --- | --- | --- |
| | | | | 24 hrs. | 144 hrs. | 216 hrs. | 408 hrs. | 552 hrs. | | |
| 9 | (Fe$_3$O$_4$—Ag—PbO/Al$_2$O$_3$)<br>  20      4    2 | 450 | 12,000 | 66 | 74 | 72 | 62 | 48 | 12 | below 5 |
| 10 | [Fe$_3$O$_4$—Ag$_2$O—(PbO—Al$_2$O$_3$)]H$_2$<br>  20       4           10 | 550 | 18,600 | 90 | 94 | 92 | 95 | 92 | 32 | below 5 |
| 11 | [Fe—Ag—Zn/(In$_2$O$_3$—Al$_2$O$_3$)]<br>  10  3   3       3 | 550 | 31,000 | 64 | 75 | 78 | 86 | 82 | 26 | below 5 |
| 12 | (Fe$_2$O$_3$—Ag$_2$O—ZnO/Al$_2$O$_3$)H$_2$<br>  20       2      2 | 600 | 40,000 | 86 | 90 | 91 | 93 | 90 | 28 | below 5 |

EXAMPLE 13

200 g. of commercially available ferric oxide powder, 100 g. of commercially available cupric oxide powder and 40 g. of commercially available argentous oxide powder were mixed with 1.0 kg. of alumina powder in a ball mill, and the resulting powdery mixture was incorporated with 50 g. of microcrystalline cellulose and 800 g. of alumina sol (having an alumina content of 10% by weight). The mixture was kneaded while adding water gradually. The necessary amount of water was determined by examining the kneaded state of the mixture. In this case, the amount necessary of water was found to be 130 c.c. The kneaded mixture so obtained was extruded into cylinders having a diameter of 5 mm and a length of 5 - 6 mm by means of a kneader, and the resulting cylinders were cut and rotated at 450 rpm for 12 minutes by means of a rotary granulator. The resulting spherical, clay-like mixture was dried at 40°C. a whole day and night and then at 120°C. a whole day and night. The average hardness of the resulting spherical catalyst was 5 to 7 kg. as measured by a hardness tester of the Kiya type. Then, the spherical catalyst was activated by reducing it with hydrogen at 400°C. for 6 hours, and then it was tested in a manner as will be described in Example 16 given hereinafter. The average hardness of the final catalyst so obtained was 1.6 kg.

EXAMPLE 14

An aqueous solution of 1.02 kg. of ferric nitrate, 0.3 kg. of cupric nitrate and 50 g. of silver nitrate dissolved in 1.5 liters of water was added to 1.0 kg. of commercially available alumina powder, and water was removed by evaporation to dryness. The resulting solid was dried at 120°C. a whole day and night, and the resulting block-like solid was packed in a quartz-made reaction tube placed in a tubular electric furnace maintained at 400°C. and fired in this state while passing air through the quartz-made reaction tube. The solid was further calcined at 750°C. for 4 hours and pulverized by means of a ball mill. To 1.4 kg. of the resulting pulverized catalyst were added 50 g. of finely divided cellulose and 800 g. of alumina sol (having an alumina content of 10% by weight). The resulting mixture was kneaded, with adding water, in the same manner as in Example 13. In this Example, the optimum amount of water was found to be 175 c.c. Then, the mixture was cut into cylinders having a diameter of 5 mm and a length of 5 to 7 mm by means of a kneader, and rotated at 450 rpm for 8 minutes by means of a rotary granulator. The resulting spherical catalyst was dried at 40°C. a whole day and night and then at 120°C. a whole day and night to obtain a catalyst having a hardness of 8 kg. as measured by a hardness tester of the Kiya type. This spherical catalyst was reduced with hydrogen at 450°C. for 12 hours to obtain an activated spherical catalyst having an average hardness of 1.1 kg.

COMPARATIVE EXAMPLE 1

When preparation of a catalyst was conducted in the same manner as in Example 13 except that cellulose was not added, the moldability was extremely poor and the molded cylinders extruded by the kneader crumbled into pieces.

COMPARATIVE EXAMPLE 2

When preparation of a catalyst was conducted in the same manner as in Example 13 except that the kneading was effected without addition of alumina sol, though the moldability was improved, the necessary amount of water was greatly increased and therefore, the hardness of the resulting spherical catalyst was as low as 0.3 kg.

EXAMPLE 15

10 Kg. of commercially available alumina sol (having an alumina content of 10% by weight) was incorporated with 0.8 kg. of basic ferric acetate, 0.2 kg. of cupric acetate and 40 g. of silver acetate, and the mixture was violently agitated in a beaker to knead the metal components homogeneously into the alumina sol. The resulting slurry was sprayed little by little to an iron plate heated at 400°C. from the beaker to dry and decompose the mixture. The resulting solids were collected, and heated and calcined for 4 hours in an electric furnace maintained at 700°C. The calcined product was pulverized by means of a ball mill, and 1.2 kg. of the resulting powdery catalyst was incorporated with 30 g. of finely divided cellulose and 700 g. of alumina sol (having an alumina content of 10% by weight). A suitable amount of water was added to the mixture and it was then kneaded. The optimum amount of water was found to be 165 c.c. in this Example. Then, the mixture was cut by a kneader, rotated at 750 rpm for 9 minutes by means of a rotary granulator, and dried at 40°C. a whole day and night and at 120°C. a whole day and night to obtain a spherical catalyst of a diameter of 5 mm having an average hardness of 7.5 kg. as measured by a hardness tester of the Kiya type. The spherical catalyst so obtained was calcined at 550°C. for 2 hours and reduced with hydrogen at 400°C. for 6 hours to obtain an activated spherical catalyst having an average hardness of 0.9 kg.

EXAMPLE 16

With respect to each of the spherical catalysts obtained in Examples 13 to 15, the activity for treating an automobile exhaust gas was tested to obtain results shown in Table 3. An automobile used for the test was Datsun (registered trade name of an automobile manufactured and sold by Nissan Jidosha K. K.) equipped with an engine of a 1,300-c.c. capacity. The rotation rate of the engine and the composition of the exhaust gas at the inlet of the catalyst layer were as indicated in Table 3. The temperature of the catalyst layer was maintained at 600°C. and the exhaust gas was passed at a space velocity of 20,000 hr$^{-1}$.

c.c. engine of bluebird (registered trade name of an automobile manufactured and sold by Nissan Jidosha K. K.) operated at 2,000 rpm with a gear ratio for high speed (average composition (by volume) of the ex- Table 3

| | Operation Conditions | | |
|---|---|---|---|
| | 1800 rpm | 220 rpm | 2000 rpm at a gear ratio for high speed |
| | Inlet Gas Composition (CO/HC/O$_2$/NO$_x$) | Inlet Gas Composition (CO/HC/O$_2$/NO$_x$) | Inlet Gas Composition (CO/HC/O$_2$/NO$_x$) |
| Catalyst Preparation Method | 4.3%/1000 ppm/1.6%/300 ppm NO$_x$ Conversion, % / CO Conversion, % | 1.8%/650 ppm/1.4%/490 ppm NO$_x$ Conversion, % / CO Conversion, % | 0.7%/450 ppm/1.4%/660 ppm NO$_x$ Conversion, % / CO Conversion, % |
| Example 13 | 90 / 16 | 75 / 45 | 58 / 80 |
| Example 14 | 97 / 18 | 89 / 55 | 80 / 90 |
| Example 15 | 94 / 16 | 80 / 55 | 75 / 90 |

EXAMPLE 17

200 c.c. of the molded catalyst prepared in Example 14 was packed into a tubular iron-made reaction tube, and the reaction tube was placed in a tubular electric furnace maintained at 550°C. A part of a factory exhaust gas (having average composition (by volume) of 1.5% of carbon monoxide, 0.4% of propane, 0.15% of propylene, 1.1% of oxygen, 4.6% of steam, 6.8% of carbon dioxide gas and 160 ppm of nitrogen oxides, the balance being nitrogen) was branched and introduced into the packed reaction tube at a flow rate of 5 m$^3$/hr. At this time, the interior temperature of the catalyst layer was elevated to 495°C. The gas was analyzed at the inlet and outlet of the reaction tube to examine the activity of the catalyst for eliminating nitrogen oxides. As a result, it was found that the conversion of nitrogen oxides was 88.5% and this high activity was maintained for more than 10 days.

EXAMPLE 18

150 c.c. of an aqueous solution containing in the dissolved state 102 g. of ferric nitrate, 16.3 g. of copper nitrate and 5.7 g. of silver nitrate was added to 100 g. of commercially available powdery alumina. Water was removed by evaporation to dryness on a hot water bath, and the resulting solid was dried at 120°C. a whole day and night. Then, the resulting blocky solid was heated and calcined at 700°C. for 4 hours, and was then reduced at 400°C. for 6 hours with a 1 : 1 volume ratio gas mixture of hydrogen and hydrogen sulfide to obtain a catalyst.

40 c.c. of the catalyst so obtained was packed into a reaction tube, and an exhaust gas coming from a 1,400- haust gas was 1.6% of CO, 690 ppm of HC, 750 ppm of NO$_x$ and 1.6% of O$_2$, the balance being H$_2$O, CO$_2$ and N$_2$), was introduced into the reaction tube at such a flow rate that the space velocity was 26,000 hr$^{-1}$. In this state the continuous operation was conducted at a temperature of 600°C.

24 Hours after the initiation of the operation, the conversion of NO$_x$ was 89%, and 240 hours after the initiation of the operation the conversion of No$_x$ was 92%. Even 660 hours after the initiation of the operation, the conversion of NO$_x$ was as high as 93%.

What is claimed is:

1. In a method for eliminating toxic substances contained in exhaust gases containing nitrogen oxides, the improvement which comprises contacting an exhaust gas with a catalytic composition deposited on a carrier and comprising:
   a. iron, iron oxide or iron sulfide;
   b. silver, silver oxide or silver sulfide; and
   c. at least one member selected from the group consisting of copper, beryllium, zinc, lead, indium, lanthanum, cerium, and oxides thereof and copper sulfide.

2. A method according to claim 1 wherein the exhaust gas is an exhaust gas discharged from an internal combustion engine.

3. Method according to claim 1 wherein said catalyst is deposited on an alumina carrier.

4. Method according to claim 1 wherein said catalyst is in admixture with powdered alumina, finally divided cellulose and alumina sol and is in spherical form.

* * * * *